United States Patent [19]

Aghajan et al.

[11] Patent Number: 5,311,600
[45] Date of Patent: May 10, 1994

[54] METHOD OF EDGE DETECTION IN OPTICAL IMAGES USING NEURAL NETWORK CLASSIFIER

[75] Inventors: Hamid K. Aghajan; Thomas Kailath, both of Stanford, Calif.

[73] Assignee: The Board of Trustees of the Leland Stanford Junior University, Stanford, Calif.

[21] Appl. No.: 953,392

[22] Filed: Sep. 29, 1992

[51] Int. Cl.$^5$ .............................................. G06K 9/00
[52] U.S. Cl. ........................................ 382/14; 382/22
[58] Field of Search ............... 382/22, 14, 15; 395/21, 395/23

[56] References Cited

U.S. PATENT DOCUMENTS 3,069,654 12/1962 Hough ............................ 340/146.3
3,882,454 5/1975 Marie et al. ......................... 382/22

OTHER PUBLICATIONS

Marr, "Theory of Edge Detection," Proc. R. Soc. Lond. B, 1980, pp. 187–217.
Canny, "A Computational Approach to Edge Detection," IEEE Trans Pattern Anal. & Mach. Intel., vol. PAMI-8, No. 6, Nov. 1985, p. 679.
Torre, "On Edge Detection," IEEE Trans. on Pattern Anal. & Mach Intel., vol. PAMI-8, No. 2, Mar. 1986, pp. 147–163.
Duda, "Use of the Hough Trans. to Detect Lines & Curves in Pic" Comm. of ACM, vol. 15, No. 1, Jan. 1972, pp. 11–15.
Petkovic, "Projection-based High Acc. Meas. of Straight Line Edges," Mach. Vision & App,. 1:183–199, 1988, pp. 183–199.
Douglas, "An Adap. Edge Dect. Meth. Using a Mod. Sigmoid-LMS Algorithm," Info. Sys. Lab., Stanford Univ., undated, pp. 1–5.
Kohonen, "Self-Orgz'd Formation of Topo. Correct Feature Maps," Bio. Cybernetics, 43:59–69, Springer-Verlag 1982, pp. 511–521.
Kohonen, Self-Organization and Assoc. Memory, Springer-Verlag, 1989, (Table of Contents attached to PTO-1449).
Kangas, "Variants of Self-Organizing Maps," IEEE Trans. on Neural Networks, vol. 1, No. 1, Mar. 1990, pp. 93–99.
Duda, Pattern Classification and Scene Analysis, John Wiley & Sons, 1973, (Table of Contents is attached).
Jain, Fundamentals of Digital Image Processing, Prentice Hall, 1989, (Table of Contents attached to PTO-1449).
Aghajan, "Edge Detec. for Optical Image Metrology Using Unsupervised Neural Network Learning," Proc. of IEEE Workshop on Neural Networks for Signal Proc., New Jersey, 1991, p. 189.

Primary Examiner—Leo H. Boudreau
Attorney, Agent, or Firm—Townsend and Townsend Khourie and Crew

[57] ABSTRACT

An image processor employing a camera, frame grabber and a new algorithm for detecting straight edges in optical images is disclosed. The algorithm is based on using a self-organizing unsupervised neural network learning to classify pixels on a digitized image and then extract the corresponding line parameters. The image processor is demonstrated on the specific application of edge detection for linewidth measurement in semiconductor lithography. The results are compared to results obtained by a standard straight edge detector based on the Radon transform; good consistency is observed; however, superior speed is achieved for the proposed image processor. The results obtained by the proposed approach are also shown to be in agreement with Scanning Electron Microscope (SEM) measurements, which is known to have excellent accuracy but is an invasive measurement instrument. The method can thus be used for on-line measurement and control of microlithography processes and for alignment tasks as well.

1 Claim, 8 Drawing Sheets

METHOD OF EDGE DETECTION IN OPTICAL IMAGES USING NEURAL NETWORK CLASSIFIER

BACKGROUND OF THE INVENTION

This invention relates generally to digital image processing, and more particularly the invention relates to edge detection in an optical image using a neural network classifier for pixel weighting.

Edge detection and enhancement is one of the most demanding tasks in optical image processing for artificial vision and image matching works. The edge detection process simplifies the subsequent analysis of images by drastically reducing the amount of data to be processed, while still preserving useful information about the image. Several approaches have been developed for edge detection. Among them, one may mention the Gaussian filters, which are the basis for a series of algorithms for detecting sharp edges. Several other methods for the detection of straight edges are based on producing a set of likely edge points by first applying some edge detection schemes, and then combining the resulting data to estimate the line coordinates of an edge; this can be done either by least squares fitting or by the Hough transform. There is also a projection-based detection method for straight line edges that analyzes the peaks in projection space to estimate the parameters of a line representing an edge.

In several applications, however, the assumption that the edges can be represented by sharp discontinuities is a poor one. Microlithography and wafer pattern analyzing and matching in IC-processing is one of these cases, where the edge profiles are smoothed out and blurred and the corners are rounded off by both process-introduced defects such as imperfect etching, and by filtering effects and aberrations introduced by the optical imaging system. Furthermore, the optical images taken from the wafer contain noise due to several sources such as random local changes in reflectivity of the wafer surface and the noise introduced by the imaging system. In this environment, some useful results have been obtained by Douglas and Meng, who proposed to use a neural classifier element to recognize the position of an edge by classifying the pixels into edge/non-edge categories. They use a modified sigmoid-LMS algorithm and in order to teach the filter (or adapt the weights), they artificially generate a raster-scan image in which the edges arrive as the result of a Markov finite state process, and then they add Gaussian noise to the resulting image. In this manner, their filter weights are adapted through comparing the filter output and the assumed desired response.

SUMMARY OF THE INVENTION

In the present invention, neural elements are used in a different way to learn to classify the pixels of an image into two classes of different height levels without requiring any a priori assumption about the distribution of the pixel heights or the characteristics of the noise on the image. For many applications the correct state assignments are not available, thus unsupervised learning schemes are needed.

The invention and objects and features thereof will be more readily apparent from the following description and appended claim when taken with the drawings.

DETAILED DESCRIPTION OF SPECIFIC EMBODIMENTS

Figure 1:
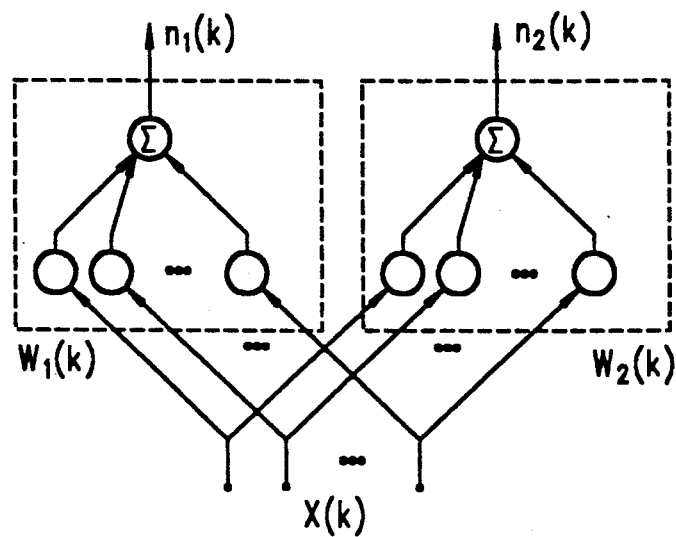
FIG. 1 is a self-organizing competitive classifier used for edge detection.

In this invention, a self-organizing competitive learning method is used for edge detection. This architecture of neural network systems is suitable for unsupervised learning and classification and has been introduced by Kohonen. A simple diagram of this network is shown in FIG. 1. The objective of a self-organizing neural network is to organize itself into units that are sensitive to specific characteristics of the input signals. In particular, the reaction of each cell (unit) becomes specific to a certain characteristic feature in the set of input signals. This method is called a topological mapping from the set of input patterns onto the set of units in the network. The dimensionality of the pattern space may be reduced in the mapping and the topological relations preserved in the map will be due to a projection from a higher-dimension space. More detailed discussion about this topological ordering can be found in prior art. This topological mapping is believed to be present in many parts of the brain. For example, there are several such mappings of visual space onto the surface of the visual cortex in the visual system. In the clustering problem, the mapping does not preserve the spatial topology of the input pattern space in the network. Instead, the units competitively become sensitive to specific features of the input patterns.

Figure 2A:
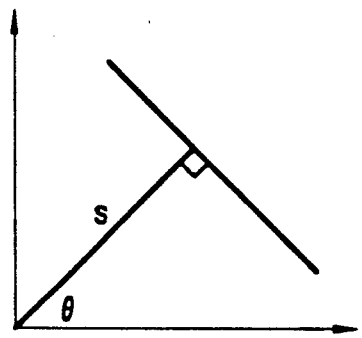
FIG. 2(a) is a line parameter configuration.

In addition, the proposed strategy uses a line fitting method to extract the parameters of edges detected by the neural networks. This scheme is based on fitting a line along the dominant eigenvector of the covariance matrix of the detected edge pixels and is equivalent to a total-least-squares line fitting method. Comparison is made between the result of this method and the lines fitted by the standard method of hough transform. We briefly describe the Hough transform here for future reference. The Hough transform maps a point (x,y) to the curve:

$$s = x\cos\theta + y\sin\theta$$

in the s - θ plane. This equation also represents the line in the x - y plane that has a distance s to the origin and the normal from the origin to it makes an angle θ with the x axis. These parameters are shown in FIG. 2(a). Therefore, all the points in the x - y plane located on the line $s_o = x\cos\theta_o + y\sin\theta_o$ are mapped to curves in the s - θ plane that all pass through the point $(s_o/\theta_o)$. To fit a straight line to a set of data points, both s and θ axes have to be quantized and then a two dimensional array of counter cells in the s - θ plane is constructed. The Hough transform equation is applied to each point in the data set and the content of cells that the corresponding curve in the transform plane passes through, is increased by one. This is done until all the data points are transformed. Then, a search is accomplished in s - θ plane to find a number of maxima that correspond to the lines parameters. The Hough transform method is especially good for cases where noise contamination is fairly high. However, the required large amount of transforms and the exhaustive two dimensional search makes this approach computationally expensive.

Since our approach is developed for edges that do not intersect, the collinear point sets can be separated from each other by simple tracing methods. Then, we are able to implement the eigenvector approach to fit straight lines to each of the point sets.

All the comparisons showed good consistency between the proposed methods and the standard schemes. However, the neural network classifier proved superior in speed over the standard methods and this advantage can be exploited for real-time applications including linewidth measurement for lithography process control.

The original idea behind competitive learning is the following:

A set of patterns $X(k) \in R^r$ is sequentially introduced as the result of a statistical event. Let $\{w_i(k), w_i \in R^r, i=1,...,p\}$ denote a set of variable reference vectors where $w_i(0)$ is initialized in some manner. At each time instant k, a certain measure of distance between the pattern x(k) and each reference vector $w_i(k)$ is calculated. The reference vector closest to x(k) is then updated in a manner to better match x(k). over time, the competing reference vectors will tend to become specifically sensitive to different features of the input pattern space.

When there are several clusters of features in the input patterns to be classified, it is necessary to have at least the same number of units in the network. In general, however, the network may contain many more units than the actual number of classes present in the pattern space. The learning in this case proceeds in a way to make each neighborhood of units sensitive to one cluster of features of input patterns.

Our approach is based on competitive learning and is summarized as follows. We first define the input patterns in terms of image pixels. For our case of a one-dimensional classifier, a specific number of adjacent pixels are introduced to the classifier each time as an input pattern. The neural network is trained on a relatively small portion of the image. The input patterns can be chosen at random locations on the image. When the weights have converged to a certain tolerance, they are applied to the entire image to classify the pixels. Denoting the input pattern at iteration k as x(k), and the reference weight vectors of the units as $w_i(k), i=1,2$, the discriminant measure is chosen as:

$$\eta_i(k) = W_i^T(k) X(k), i = 1, 2 \qquad (1)$$

Because $\eta_i$ is a measure of matching between X(k) and $W_i(k)$, the unit with the maximum value of q is selected. We denote this unit by 1. Then for unit 1 the following adaptive process can be employed to update $W_1(k)$:

$$W_1(k+1) = \frac{W_1(k) + \alpha_k X(k)}{||W_1(k) + \alpha_k X(k)||} \qquad (2)$$

where $\alpha_k$ is a gain parameter in the adaption and has a role in controlling the convergence rate and stability of adaptation. The weight vectors are normalized at each iteration. This normalization improves selectivity in discrimination. The effect of normalization in adaption is that, at each iteration, $w_1(k)$ only rotates towards the input pattern. After pixel classification, an edge map is easily formed by subtracting a one-pixel shifted version of the resulting matrix from it. This edge map is then used for fitting straight lines to edges.

Here, we use an eigenvector approach to find the line parameters that minimize the sum of normal distances. First we note that this line passes through the mean of all the points. Therefore, by subtracting the mean coordinates from all points, we translate the coordinate system origin to the mean point.

Figure 2B:
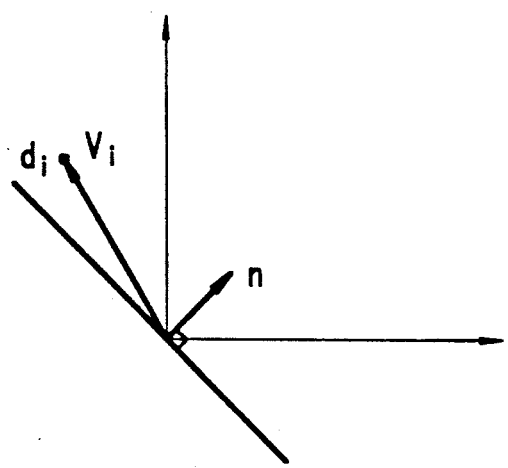
FIG. 2(b) illustrates distance from the line as inner product of v and n.

This situation is shown in FIG. 2(b). The distance $d_i$ of each data point from the line can be written now as the inner product of n, the unit normal vector to the line, and the vector $v_i$, including new coordinates of the $i^{th}$ data point, $$d_i = |n^T v_i| \qquad (3)$$

The goal is now to minimize $$\sum_{i=1}^{n} d_i^2$$

with appropriate choice of n.

We have:

$$\sum_{i=1}^{n} d_i^2 = \sum_{i=1}^{n} (n^T v_i)(v_i^T n) = n^T \left( \sum_{i=1}^{n} v_i v_i^T \right) n = n^T V n \qquad (4)$$

where $$V = \sum_{i=1}^{n} v_i v_i^T$$

is a 2×2 symmetric positive semidefinite matrix. It can be shown that $$\sum_{i}^{n} d_i^2$$

is minimized is the vector n is chosen along the eigenvector that corresponds to the smaller eigenvalue of V. Let n be a linear combination of the two (orthogonal) eigenvectors of V, e.g., $n = \alpha_1 u_1 + \alpha_2 u_2$, where we have $Vu_1 = \lambda_1 u_1$ and $Vu_2 = \lambda_2 u_2$, and also assume that $\lambda_1 \geq \lambda_2$. Expanding (4) yields:

$$\sum_{i=1}^{n} d_i^2 = (a_1 u_1^T + a_2 u_2^T) V(a_1 u_1 + a_2 u_2) = a_1^2 \lambda_1 + a_2^2 \lambda_2 \quad (5)$$

It is thus seen that $$\sum_{i=1}^{n} = d_i^2$$

is minimized if n is along the eigenvector of V that corresponds to its smaller eigenvalue. Straightforward geometry is then used to extract the line parameters s and $\theta$.

Since the contribution of outliers to line fitting makes the estimation inaccurate, the next step is to reject them. Assuming that the number of outliers is only a small portion of the number of points, it is reasonable to reject the points that are located farther than a certain distance from the fitted line. A new line can then be fitted using the remaining data points. To be more conservative, the threshold distance can be chosen as one times the standard deviation of distances of points from the fitted line.

A step by step procedure of our approach for detecting straight edges in optical images is as follows:

- A digitized image from a camera is obtained.
- A series of randomly located sequences of adjacent pixels is used to train the neural network classifier.
- The converged weights of the neural network are applied to the entire image and a binary image is obtained.
- A one-pixel shifted version of the binary image is subtracted from it to get an edge map.
- Since the lines do not cross each other, the parameters of each line can be extracted separately. A tracing operation is used to separate different sets of collinear edge pixels.
- The line fitting method is applied to the edge map to extract the edge parameters.
- Other measures for specific applications such as linewidth measurement can also be obtained using the resulting line parameters.

The neural network classification technique is applied to edge detection for the purposes of critical dimension (linewidth) measurement in integrated circuit fabrication. Since most features on IC chips are rectangular, the edges that are to be found are straight lines. The neural network edge detector is compared to an alternative method of detecting straight lines, namely a projection-based approach using the Radon transformation.

The neural network classifier and the projection-based edge detector are applied to images of patterned (or layered) silicon wafers. The images were digitized in grey scale over 256 levels and quantized into matrix form. For the neural networks, an array of vectors were constructed to contain the grey levels of a set of columnwise adjacent pixels. These vectors are used in both adaptation and classification phases.

Figure 3A:
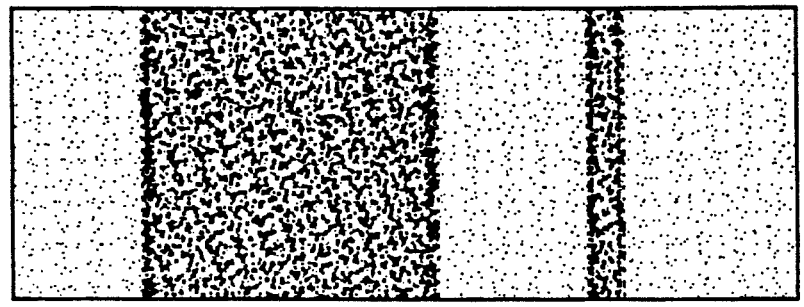
FIG. 3(a) illustrates an optical image taken from a part of a chip.
Figure 3B:
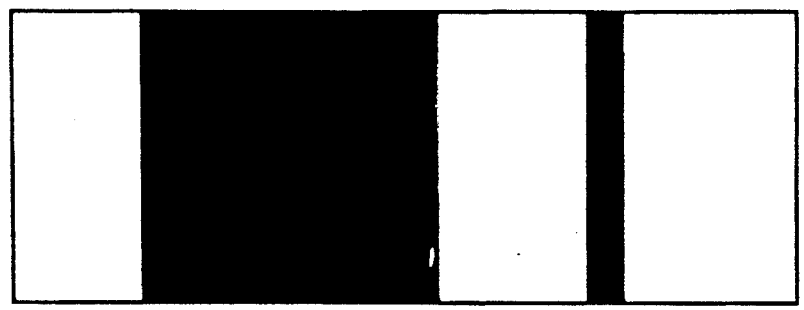
FIG. 3(b) illustrates the output of the self-organizing competitive classifier.

The image in FIG. 3(a) shows two trenches etched on a chip. The difference in brightness is due to both the focal plane location and the differences in reflectivity. FIG. 3(b) shows the result of applying the neural network approach to this image, where the image pixels are separated into two classes.

Figure 4:
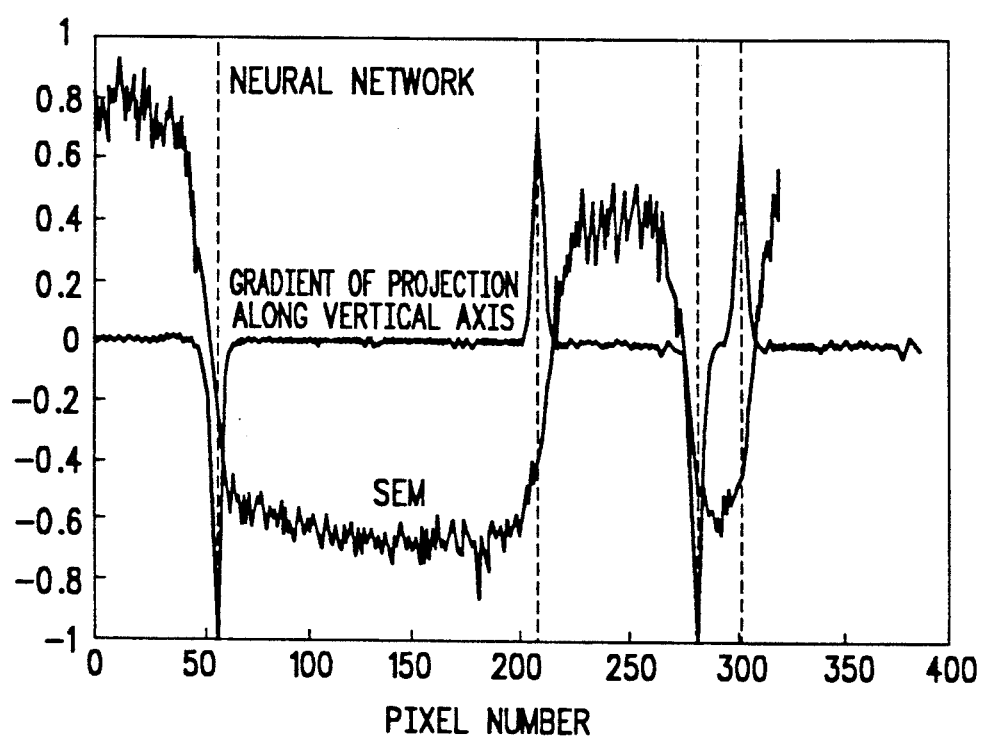
FIG. 4 illustrates a comparison of the detected edges by the explored methods and the SEM image.

FIG. 4 gives a comparison between the proposed neural network methods, the projection-based method and an SEM (Secondary or Scanning Electron Microscopy) imaging of the same wafer. The SEM measurement is known to have superior accuracy and resolution to other measurement techniques, but due to its invasive and time-consuming nature, it is restricted to off-line measurements. The noisy-looking curve in FIG. 4 is the SEM image intensity profile, where the sharp negative peakings represent the edge locations. The smoother curve shows the output of the projection-based method. Since we knew in advance that the direction of edges is vertical, the projection was performed only parallel to this direction. However, it is important to note that in general one needs to use many distinct directions to find the edge orientation as well. This necessity is further discussed below. The dashed lines represent the classification done by the neural networks. The results for neural network approaches show good agreement with the SEM photos. A maximum relative discrepancy of 2.5% was achieved. Once the edges are detected, the linewidth can be easily measured.

We now compare the practical features of the neural network edge detector with the projection-based scheme. We first note that in the projection-based methods, it is required to project the entire image along many angles. Several rotations of the image are thus needed. If the digitized image is rotated by software, distortions are introduced to the image. First, it is noted that there is an interaction between adjacent pixels in digitization of the image. This interaction is distorted by the rotation of the image matrix through software. Second, since in the new grid, each pixel covers parts of four pixels in the unrotated grid, choosing the image value for new pixels needs an averaging phase, which has a low-pass filtering effect on the image. On the other hand, if a separate image is taken for each projection direction by rotating the wafer, due to likely changes in brightness and focus, the conditions for a fair comparison between sharpness of edges in two consecutive projections cannot be met. However, in the neural network edge detector, first there is the phase of training the filter. Then, using the adapted weights, the image is filtered and the pixels are clustered. After that, the edge information, i.e., the line parameters, can be extracted by using the method described earlier. Consequently, the distortion effects due to rotation are avoided.

Figure 5A:
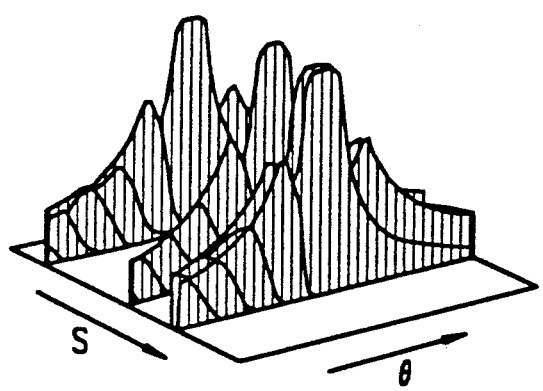
FIG. 5(a) illustrates a Hough transform output plane.
Figure 5B:
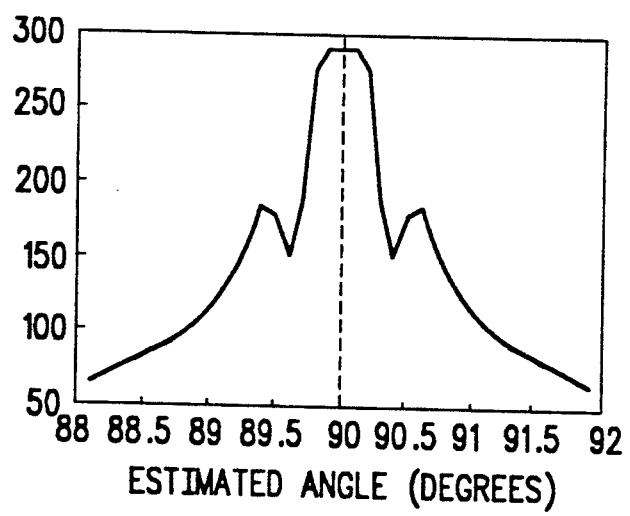
FIG. 5(b) is a curve showing the average of profiles in $\theta$ in (a) that are located at places where the s parameter is maximum.
Figure 6A:
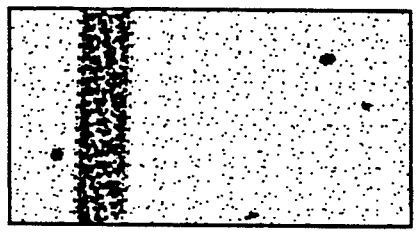
FIG. 6(a) illustrates an optical image.
Figure 6B:
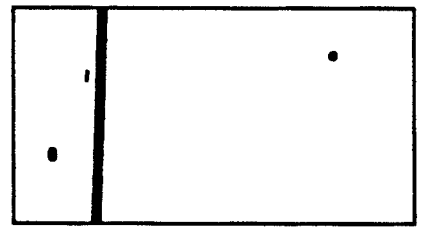
FIG. 6(b) illustrates the output of a neural network classifier.
Figure 7A:
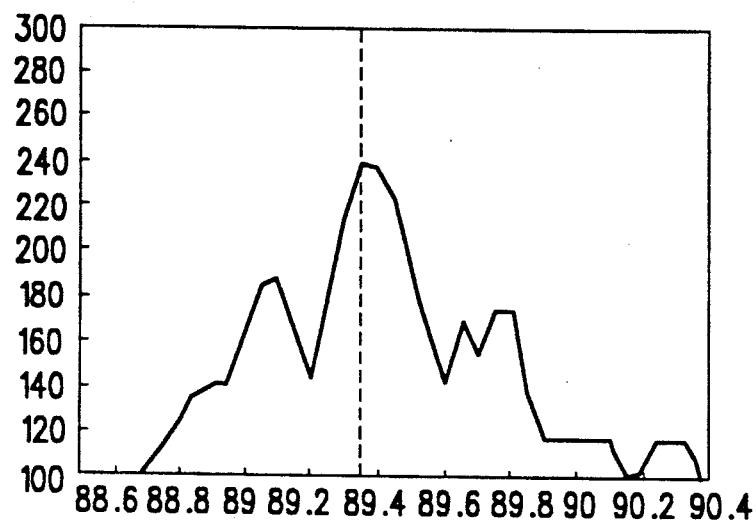
FIG. 7(a) is an estimation of angle.
Figure 7B:
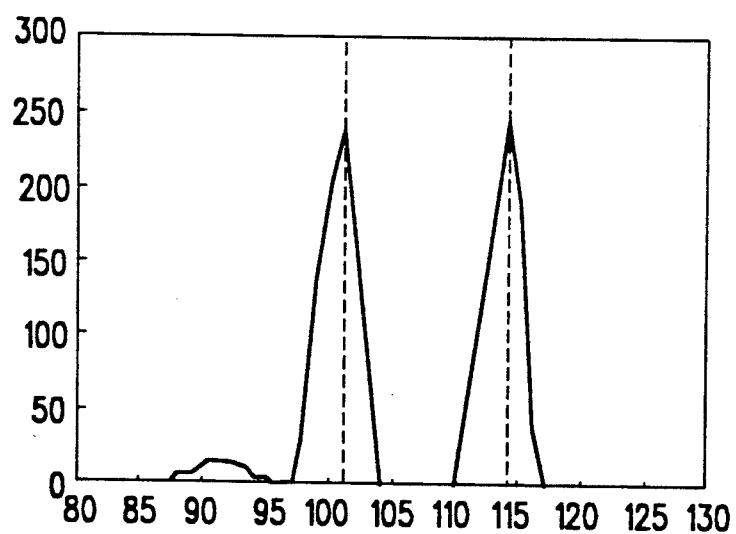
FIG. 7(b) is an estimation of distance from the origin for the trench of FIG. 6 by eigenvector line fitting and the Hough transform method.
Figure 8A:
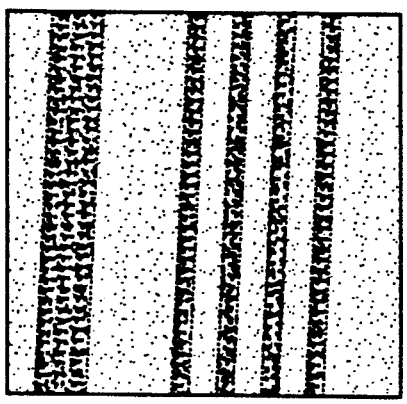
FIG. 8(a) illustrates an optical image.
Figure 8B:
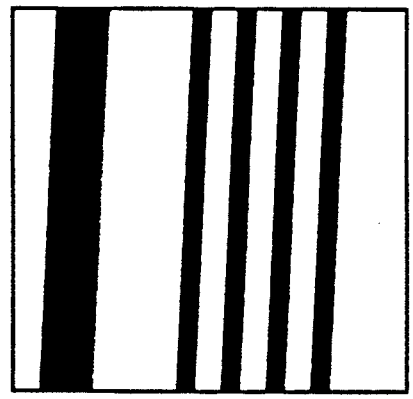
FIG. 8(b) illustrates the output of a neural network classifier.
Figure 9A:
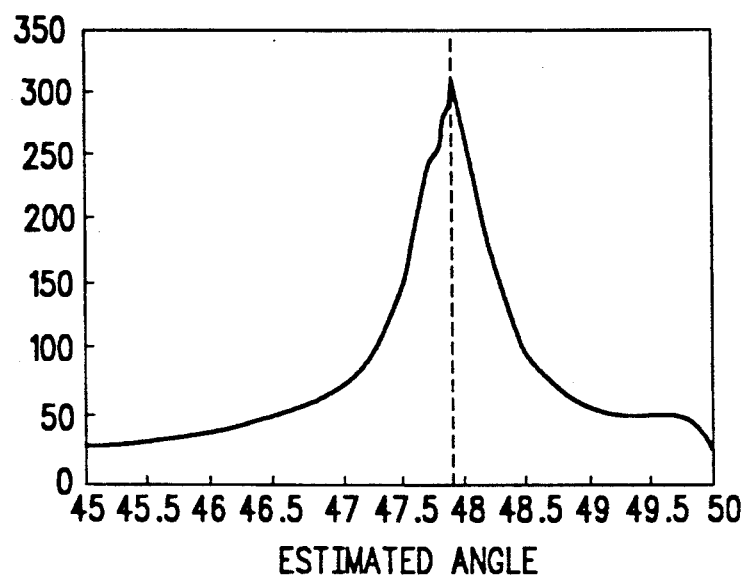
FIG. 9(a) illustrates estimated rotation angle for the trenches in FIG. 8 by eigenvector line fitting and the Hough transform method.
Figure 9B:
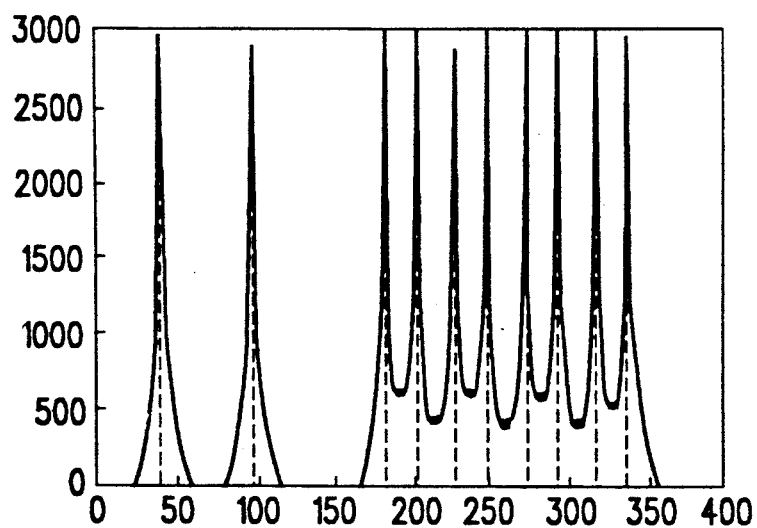
FIG. 9(b) illustrates estimated distances from the origin for edge lines in FIG. 8 by eigenvector line fitting and the Hough transform method.

We now compare eigenvector line fitting method used in the proposed strategy and the Hough transform method. We evaluated both approaches using the edge pixel set obtained by the neural network classifiers. FIG. 5(a) shows the output plane of the Hough transformation applied to the edge pixel set obtained from FIG. 3(b). The line parameters can be obtained by locating the maximum points on this plane. This needs a two-dimensional exhaustive search, which demands intensive computational effort, especially when the number of lines is unknown. FIG. 5(b) shows a comparison between the eigenvector line fitting and the Hough transform method for estimating the directions of detected edges of FIG. 3(b). The correct answer is known to be 90 degrees from the original image. The results show the two approaches to be comparable. Another image is shown in FIG. 6 along with its classified pixel map. Results of the Hough transform and eigenvector line fitting methods for this example are presented in FIG. 7. Another experiment was conducted using the neural network classifier on an image in which the image was rotated before digitizing. FIG. 8(a) shows this image, and the result of applying neural network classification is presented in FIG. 8(b). The estimated edge orientation and distances from the origin by both the Hough transform and the eigenvector line fitting are presented in FIGS. 9(a) and 9(b), respectively. Again, the results are comparable. Consequently, while producing equivalent results, the eigenvector line fitting approach is faster than the Hough transform method.

To summarize the results, an arrangement employing a camera, frame grabber, and image processing software that employs an unsupervised neural network learning method has been developed for detecting edges in optical images. The self-organizing competitive learner was implemented as the pixel classifier for detecting edges. Other architectures such as bootstrapped linear threshold classifier and a constrained maximization algorithm are alternative possibilities for pixel classification. Experiments showed good robustness and repeatability for the self-organizing classifier while the other two methods, although producing excellent results in several cases, showed sensitivity to the average brightness of the image. The results of the neural network classifiers were compared to the results obtained by a standard straight edge detector based on the Radon transform. Also a line fitting method was explored to extract the parameters of edges detected by the neural networks. This scheme was based on fitting a line along the dominant eigenvector of the covariance matrix of the detected edge pixels and was equivalent to a total-least-squares line fitting method. Comparison was made between the result of this method and the lines fitted by the standard method of Hough transform. All the comparisons showed good consistency between the proposed methods and the standard schemes. However, the neural network classifiers proved superior in speed over the standard methods and this advantage can be exploited to implement on-line critical dimension measurement for lithography process control.

What is claimed is:

1. A method of measurement of linewidths in integrated circuit fabrication comprising the steps of
   a) obtaining a digitized pixel image of a surface of said integrated circuit including conductive lines,
   b) training a neural network classifier using a series of random sequences of adjacent pixels until classifier weights are converged to a required tolerance for said measurement,
   c) applying said weights to all pixels to obtain a binary image,
   d) subtracting a one-pixel shifted version of said binary image from said binary image to obtain an edge map, and
   e) determining minimum distance between edges in said edge map as a measure of linewidths of said conductive lines.

* * * * *

UNITED STATES PATENT AND TRADEMARK OFFICE
CERTIFICATE OF CORRECTION

PATENT NO. : 5,311,600
DATED : May 10, 1994
INVENTOR(S) : Hamid K. Aghajan, et. al.

It is certified that error appears in the above-indentified patent and that said Letters Patent is hereby corrected as shown below:

Column 1, after the title, insert the following paragraph:

--This invention was made with Government support under contract No. F49620-90-C-0014 awarded by the DARPA. The Government has certain rights in this invention.--

Signed and Sealed this

Thirteenth Day of December, 1994

Attest:

BRUCE LEHMAN

*Attesting Officer*   *Commissioner of Patents and Trademarks*